United States Patent

Knothe et al.

[15] 3,653,013
[45] Mar. 28, 1972

[54] ARRANGEMENT FOR RESOLUTION AND DIGITAL DISPLAY OF WEIGHING RESULTS

[72] Inventors: Erich Emil Knothe, Gehrenring 21, 34 Gottingen-Geisnar; Franz Josef Melcher, Auf der Lieth 32, Gottingen-Nikolausberg, both of Germany

[22] Filed: Oct. 21, 1969

[21] Appl. No.: 868,176

[30]         Foreign Application Priority Data

Oct. 25, 1968   Germany...................P 18 05 049.2

[52] U.S. Cl..............................................340/177, 324/98
[51] Int. Cl..................................G01r 19/00, G08b 21/00
[58] Field of Search....................340/177, 177 CA; 324/98

[56]              References Cited

UNITED STATES PATENTS

| | | | |
|---|---|---|---|
| 2,448,783 | 9/1948 | Giers | 340/177 |
| 2,707,222 | 4/1955 | Brown | 340/177 |
| 2,712,127 | 6/1955 | Miller | 340/177 |
| 3,745,087 | 5/1956 | Dickinson | 340/177 |
| 3,268,665 | 8/1966 | Miller et al. | 340/177 CA |

*Primary Examiner*—Harold I. Pitts
*Attorney*—Edmund M. Jaskiewicz

[57]              ABSTRACT

An arrangement on an electrical weighing balance for the digital display of weighing results. The balance has an output voltage analogous to the load. An analogue-digital converter having several digit display units is connected to the output of the balance. There is an additional digit display unit and a voltage compensating circuit and an amplifier with selectable amplifying factors of 10 and 1 which can be switched in between the output of the balance and the input of the ADC, and voltages from 0 to 9/10 of their input voltages are selectively adjustable in stages of respectively one-tenth on the voltage compensating circuit, whereby initially the output voltage of the balance is fed to the ADC, bypassing the compensating circuit and with an amplifying factor 1 of the amplifier, the highest place displayed digit can then be adjusted on the additional DDU, a compensating voltage of which can be adjusted on the compensating circuit and the amplifier can be changed over to the amplifying factor 10. The additional unit may be replaced by two additional units and the amplifier will have an amplifying factor of 100.

14 Claims, 2 Drawing Figures

ARRANGEMENT FOR RESOLUTION AND DIGITAL DISPLAY OF WEIGHING RESULTS

BACKGROUND OF THE INVENTION

The invention relates to an arrangement on an electrical weighing balance for the digital display of weighing results, the electrical balance having an output voltage analogous to the load, in which an analogue-digital converter ("ADC") having several digit display units ("DDU"s) is connected to the output of the electrical balance.

With such arrangement, the indication of a balance can be read fully digitally and the probability of reading errors is thereby reduced.

Digital voltage measuring instruments having a high resolving capacity and a small measuring error are comparatively costly, at any rate their price is very large compared with the price of a balance. Advantageously, the display should have at least an equally high resolution capacity and an equally small measuring error as the balance.

OBJECT OF THE INVENTION

The object of the present invention is to provide an arrangement in which the expense for a digital voltage measuring instrument is reduced by employing an instrument of lesser resolution capacity than the balance but, nevertheless, so constructed that no resolution capacity is forfeited.

In the case of an arrangement of the type mentioned at the beginning this task is solved, in accordance with the invention, in that for the use of an ADC, the resolution capacity of which up to a factor of 10 is smaller than that of the balance, an additional DDU providing a further decimal place is arranged in front of said several DDUs of the ADC, in that any desired digit is separately adjustable on the additional DDU, and there is provided a voltage compensating circuit and an amplifier with selectable amplifying factors of 10 and 1 which can be switched-in between the output of the balance and the input of the ADC, and voltages from 0 to 9/10 of their input voltages are selectively adjustable in stages of respectively one/tenth on the voltage compensating circuit, whereby initially the output voltage of the balance is fed to the ADC, by-passing the compensating circuit and with an amplifying factor 1 of the amplifier, the highest place-value displayed digit can then be adjusted on the additional DDU, a compensating voltage can be adjusted on the compensating circuit and the amplifier can be changed over to the amplifying factor 10.

Thus, it is an object that the full output voltage of the balance is permitted to be initially indicated directly by the ADC. As a result of the inadequate sensitivity of the ADC, the last place is usually not indicated correctly, or the digits jump to and fro between two or three values. This indication is used initially only to read off the first place. Subsequently the first place is manually set on the additionally provided digit display unit. Now, only the residual value of the voltage requires to be indicated by the ADC. For this, however, only a resolution capacity which is less by a power of 10 is necessary. There is now fed to the ADC a voltage of which a part, namely the portion corresponding to the first digit, has been compensated by the compensating circuit, so that just the remaining part is to be indicated which corresponds to all the digits except for the first. In order that this residual voltage is indicated from the first DDU of the ADC on, it has to be amplified exactly by the factor 10, before it is fed to the ADC.

In the result, the initially displayed number has been shifted by one decimal place to the left. The digit displayed initially by the last DDU of the ADC is now displayed by the penultimate DDU thereof, for which the resolution capacity of the ADC is adequate. The last DDU, which now displays unsteadily a meaningless place, can be cut out.

In the instance depicted here, an ADC has been made available the resolution capacity of which is less by a power of ten than that of the balance. Accordingly, a DDU for the first digit, to be set separately, has to be switched in circuit prior to the ADC.

In addition to this, an ADC can also be made available, the resolution capacity of which is up to two powers of 10, in other words by the factor 100, less than that of the balance. Thus, in this case two additional DDUS are switched in circuit, an amplifier with the amplifying factor 100 is provided and a voltage compensating circuit having 100 stages is used.

DETAILED DESCRIPTION OF THE APPARATUS

Figure 1:
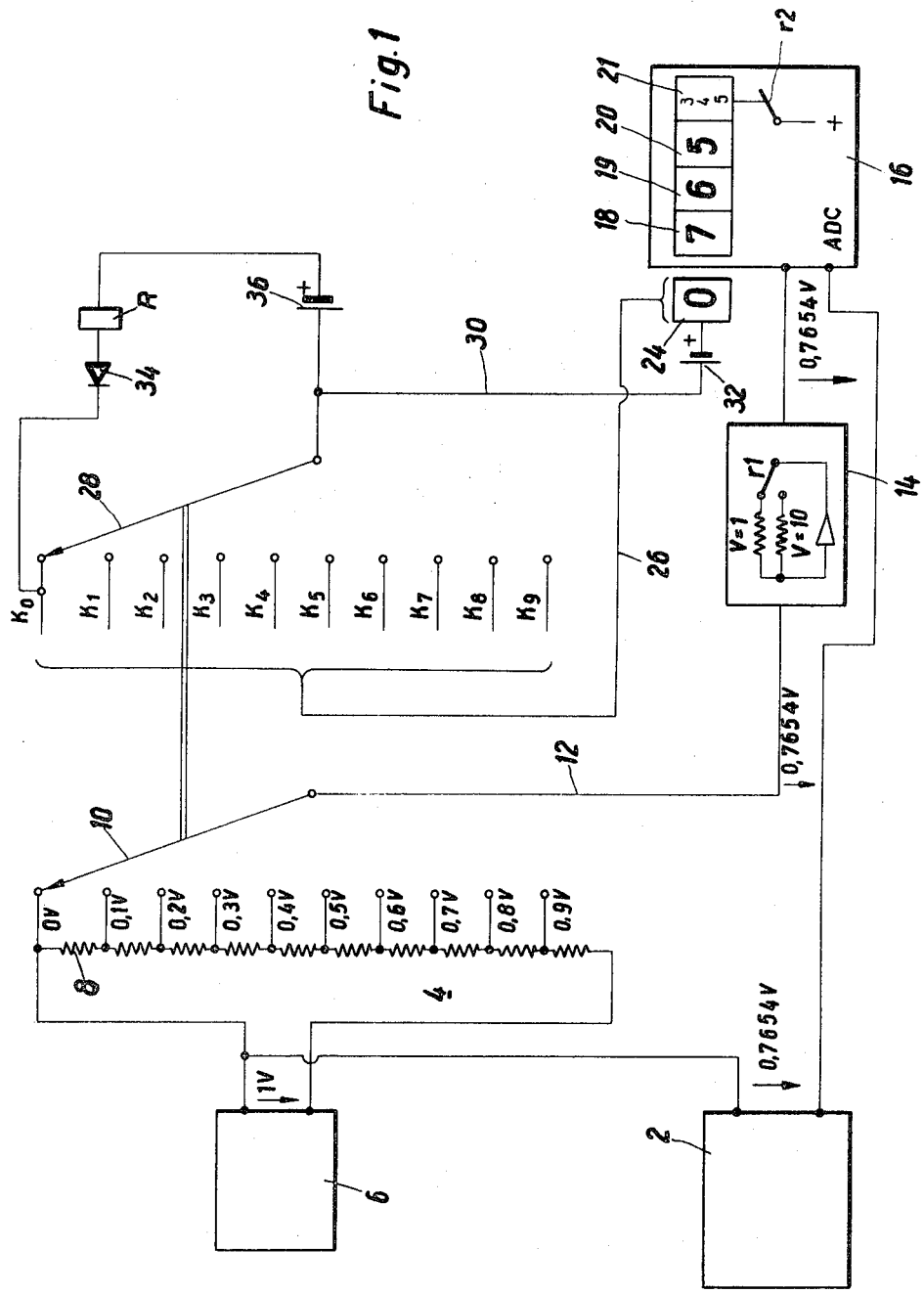
FIG. 1 shows the circuit diagram of the arrangement for the initially ensuing reading.
Figure 2:
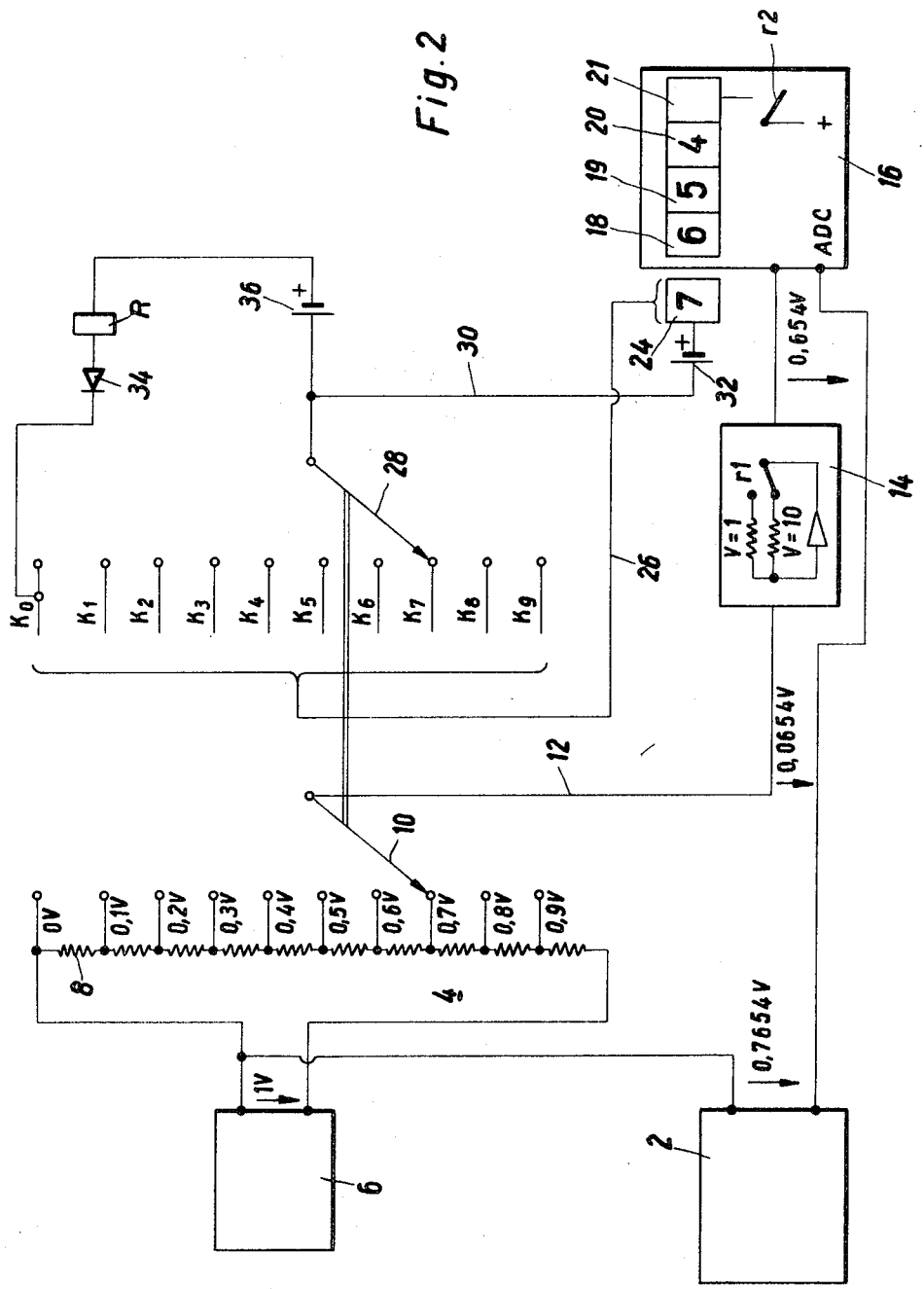
FIG. 2 shows the same circuit diagram, adjusted for the final reading.

As shown by FIGS. 1 and 2, there is connected to the electrical output of the balance 2 the voltage compensating circuit designated as a whole by 4. This comprises a series connection of ten equal precision resistances 8 connected to a constant voltage source of 1 volt. At each of these resistances there, therefore, occurs a voltage drop of 0.1 volt under the influence of the constant voltage source 6. Any desired number of tenths of a volt between 0 and 0.9 can be tapped off through a switching arm 10. The arm 10 is connected via a lead 12 to the input of the amplifier 14. With the aid of a changeover contact $r1$, the inverse feedback of the amplifier, which simultaneously operates as an impedance amplifier, can be changed in such a way that the amplification amounts in one position to $V = 1$ and in the other position to $V = 10$. The analogue-digital converter (ADC) 16 is connected to the amplifier output. It comprises four digit display units 18 to 21, of which the unit 21 can be cutout by an operating contact $r2$.

Arranged in front of the digit display unit (DDU) 18 of the ADC is a separate DDU 24, which is not fed from the ADC. Its ten input connections, which correspond to the digits 0 to 9, are connected via ten leads (indicated by the line 26) to ten contacts $k0$ to $k9$. For tapping the contacts $k0$ to $k9$ there is a switching arm 28, which for synchronism is connected mechanically to the switching arm 10. The switching arm 28 is connected electrically via a lead 30 to a current source 32. The other end thereof is connected to the collective connection of the DDU 24.

The contact $k0$ is, moreover, connected via a rectifier 34, a relay winding R and a source of current 36 to the contact arm 28. The relay winding R actuates upon connection of the contacts $r1$ and $r2$.

Current is to flow through the relay winding R only upon setting of the switching arm 28 to the contact $k0$, namely under the influence of the source of current 36. On the other hand, current is to be prevented from flowing through the relay winding R, the contact $k0$, one of the leads 26, the DDU 24, the source of current 32 thereof and the source of current 36 of the relay R, in the case of other positions of the switching arm 28. In order to prevent this, the rectifier 34 is switched in. The sources of current 32 and 36 and this rectifier are so poled that such a current is eliminated.

METHOD OF OPERATION

For reading, the switching arms 10 and 28 are brought into the zero position in accordance with FIG. 1. The relay winding R receives current and brings the contacts $r1$ and $r2$ into the positions represented in FIG. 1. The amplifier 14 works with $V = 1$, and the last DDU 21 is switched in. The voltage compensating circuit 4 is switched out by the switching arm 10.

The load that is to be weighed may bring about an output voltage of the balance of 0.7654 volts. This voltage is then fed to the ADC as input voltage. The first three DDUs display the digits 7, 6 and 5, whilst the fourth DDU gives a display which fluctuates around the digit 4, for example jumps to and fro between the digits 3, 4 and 5. The DDU 24 is adjusted to the value 0. Alternatively, this DDU could also simply be switched off, so that it gives no display.

Of the digits displayed by the ADC, initially only the first, in other words ADC 7, is of interest. The switching arms 10 and 28 are now adjusted into the position in accordance with FIG. 2, whereby care only has to be taken to see that the digit 7 now appears on the DDU 24. Everything else takes place automatically. The digit 7 appears when the switching arm 28 is adjusted to the contact k7. At the same time, 0.7 volts are then tapped off by the switching arm 10 at the resistance 8 of the voltage compensating circuit. At the seven tapped resistances there are now superimposed two voltages, namely the output voltage of the balance of 0.7654 volts and the partial voltage, opposed to this output voltage, of the constant voltage source of 0.7 volts. There remains a voltage of 0.0654 volts, which is now fed to the amplifier 14.

Because the switching arm 28 has been taken away from its contact k0, the relay winding R has become currentless. Consequently, the contacts r1 and r2 have been changed over into the positions in accordance with FIG. 2.

After amplification by the factor 10, there emerges a voltage of 0.654 volts, which is now fed to the ADC. Its three first DDUs display the digits 6, 5 and 4. The last DDU, which would give a meaningless indication, has been switched off by the contact r2.

The adjustment in accordance with FIG. 1 showed that the ADC 16 was, as a result of too slight a resolution capacity, not in a position to indicate satisfactorily the final valid decimal place of the weighing result. In the case of the setting in accordance with FIG. 2 it is therefore also only required of the ADC, instead of the four valid decimal places, to display three valid decimal places, which as far as the last place is possible within the scope of its resolution capacity, whilst the first place has been adjusted by hand on the additional DDU 24. Through this arrangement an ADC can be used the resolution capacity of which up to the factor 10 is smaller than that of the balance.

In the case of this arrangement, the accuracy of the series connection of the precision resistances should be at least as great as the accuracy of the weighing result. The error, about which the voltage amplification ratio 10 of the amplifier 14 fluctuates, may not be greater than the error of the ADC.

If one wishes to make do with an ADC which up to the factor 100 is less accurate than the balance, then one can connect two DDUs instead of the one DDU 24 in front of the ADC, one can provide an amplifier with the amplification factor 100 and one can work with contact arms which are adjustable to 100 switching positions. Accordingly also 100 precision resistances 8 are necessary for the voltage compensation.

In the case of the examples represented in FIGS. 1 and 2, the voltage compensating circuit 4 is arranged on the input side of the amplifier 14. The arrangement could also be made conversely, only then a constant voltage source of tenfold voltage would have to be used and at the same time the amplifier 14 would have to be capable of modulation by the factor 10 higher.

In a manner known "per se" the indication can, in addition, be improved by the correctly placed insertion of a decimal point.

All the D.D.U.'s 18 to 21 and 24 can be accommodated in a common faceplate.

Instead of digit display units, the analogue-digital converter (A.D.C.) can also adjust the printing rollers of a printer. Alternatively, the digital data can be fed, via a coding device, to an accounting machine or a computer.

We claim:

1. For an electrical weighing balance having an output voltage analogous to the load, an arrangement for the digital display of weighing results, comprising an analogue-digital converter connected at the output of the electrical balance and having several digit display units, the analogue-digital converter having a resolving capacity up to a factor of 10 smaller than that of the electrical balance, an additional digit display unit providing a higher decimal place arranged in front of said several digit display units of the analogue digital converter, any desired digit being separately adjustable on said additional digit display unit, a voltage compensating circuit, an amplifier with selectable amplifying factors of 10 and 1, and means for switching in said voltage compensating circuit and said amplifier between the output of the balance and the input of the analogue digital converter, voltages from 0 to 9/10 of their input voltages being selectively adjustable in stages of respectively one-tenth on the voltage compensating circuit, whereby initially the output voltage of the balance can be fed to the analogue digital converter, bypassing the compensating circuit and with an amplifying factor 1 of the amplifier, the decimal place highest displayed digit n can then be adjusted on the additional digit display unit, a compensating voltage of n/10 can be adjusted on the compensating circuit and the amplifier can be changed over to the amplifying factor 10.

2. For an electrical weighing balance, having an output voltage analogous to the load, an arrangement for the digital display of weighing results, comprising an analogue-digital converter connected to the output of the electrical balance and having several digit display units, the analogue-digital converter having a resolving capacity up to a factor 100 smaller than that of the electrical balance, two additional digit display units providing further higher decimal places arranged in front of the said several digital display units of said analogue-digital converter, any desired digits being separately adjustable on said additional digit display units, a voltage compensating circuit, an amplifier with selectable amplifying factors of 100 and 1, and means for switching in said voltage compensating circuit and said amplifier between the output of the balance and the input of the analogue-digital converter, voltages from 0 to 99/100 of their input voltages being selectively adjustable in stages of respectively one one-hundredth on the voltage compensating circuit whereby initially the output voltage of the balance can be fed to the analogue-digital converter, bypassing the compensating circuit and with an amplifying factor 1 of the amplifier, the two decimal places highest displayed digits m and n can then be adjusted on the two additional digital display units, a compensating voltage of (10m + n) / 10 can be adjusted on the compensating circuit and the amplifier can be changed over to the amplifying factor 100.

3. An arrangement as claimed in claim 1, wherein the place-value lowest digit display unit is disconnectible.

4. An arrangement as claimed in claim 1, further comprising a series connection of ten like precision resistances constituting said voltage compensating circuit and a constant voltage source to which said resistances are connected and means for switching one or more of said resistances selectively into a circuit between the balance and the analogue-digital converter in such a way that the voltage applied to them is opposed to the output voltage of the balance.

5. An arrangement as claimed in claim 1, wherein said amplifier is arranged after said voltage compensating circuit.

6. An arrangement as claimed in claim 1, further comprising a switch with a switching arm and a group of ten contacts each of said ten contacts being connected to one of ten digital connections of said additional digit display unit and said switching arm being connected, via a source of current, to a collective connection of said digit display unit, a relay having a changeover contact and a winding connected to the contact, corresponding to the digit 0, of the group such that the winding responds only upon switching-in of the zero contact, and said changeover contact of the relay lying in the amplifier circuit, wherein said changeover contact, only when the zero contact is switched-in, changes the amplifier over to the amplifying factor 1, but otherwise allows it to work with the amplifying factor 10 in the circuit between the electrical balance and the analogue-digital converter.

7. An arrangement as claimed in claim 6, wherein said relay has an operating contact in the current supply to the place value lowest digit display unit of the analogue-digital converter.

8. An arrangement as claimed in claim 6, further comprising a rectifier connected in series with said relay winding and a source of current in a forward direction such that, upon switching-in of the zero contact, current from said source of current flows through said relay winding and said switching arm, but current is prevented from flowing in series through the additional digit display unit and the relay winding.

9. An arrangement as claimed in claim 2, wherein the two place-value lowest digit display units are disconnectible.

10. An arrangement as claimed in claim 2, further comprising a series connection of hundred like precision resistances constituting said voltage compensating circuit and a constant voltage source to which said resistances are connected and means for switching one or more of said resistances selectively into a circuit between the balance and the analogue-digital converter in such a way that the voltage applied to them is opposed to the output voltage of the balance.

11. An arrangement as claimed in claim 2, wherein said amplifier is arranged after said voltage compensating circuit.

12. An arrangement as claimed in claim 2, further comprising a switch with two switching arms and two groups of ten contacts each, each of said ten contacts of each group being connected to one of ten digital connections of one of said additional digit display units and said switching arms being connected, via a source of current, to a collective connection of said digit display units, a relay having a changeover contact and a winding connected to the contact, corresponding to the digit 0, of each group such that the winding responds only upon switching-in of the zero contact, and said changeover contact of the relay lying in the amplifier circuit, wherein said changeover contact, only when the zero contact is switched-in, changes the amplifier over to the amplifying factor 1, but otherwise allows it to work with the amplifying factor 100 in the circuit between the electrical balance and the analogue-digital converter.

13. An arrangement as claimed in claim 12, wherein said relay has an operating contact in the current supply to the two place-value lowest digit display units of the analogue-digital converter.

14. An arrangement as claimed in claim 12, further comprising a rectifier connected in series with said relay winding and a source of current in a forward direction such that, upon switching-in of the zero contact, current from said source of current flows through said relay winding and said switching arms, but current is prevented from flowing in series through the additional digit display units and the relay winding.

* * * * *